(12) United States Patent
Kitahashi

(10) Patent No.: US 10,275,127 B2
(45) Date of Patent: Apr. 30, 2019

(54) CLIENT APPARATUS, INFORMATION PROCESSING SYSTEM, INFORMATION PROCESSING METHOD, AND NON-TRANSITORY COMPUTER READABLE MEDIUM

(71) Applicant: FUJI XEROX CO., LTD., Tokyo (JP)

(72) Inventor: Tomoki Kitahashi, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 142 days.

(21) Appl. No.: 15/340,521

(22) Filed: Nov. 1, 2016

(65) Prior Publication Data

US 2017/0357519 A1    Dec. 14, 2017

(30) Foreign Application Priority Data

Jun. 9, 2016    (JP) ................................ 2016-115423

(51) Int. Cl.
| | |
|---|---|
| *H04L 29/08* | (2006.01) |
| *G06F 3/0484* | (2013.01) |
| *G06F 3/0481* | (2013.01) |
| *G06F 9/451* | (2018.01) |

(52) U.S. Cl.
CPC ........ *G06F 3/0484* (2013.01); *G06F 3/04817* (2013.01); *G06F 9/451* (2018.02)

(58) Field of Classification Search
CPC ...... G06F 3/451; G06F 3/0484; G06F 3/0481; G06F 3/0482; G06F 3/04842; G06F 3/04817; G06F 9/451
USPC ........................................................ 715/746
See application file for complete search history.

(56) References Cited

U.S. PATENT DOCUMENTS

| | | | | | |
|---|---|---|---|---|---|
| 5,710,918 | A | * | 1/1998 | Lagarde | G06F 17/30893 |
| 5,745,754 | A | * | 4/1998 | Lagarde | G06F 17/30893 |
| 6,456,307 | B1 | * | 9/2002 | Bates | G06F 3/0481 |
| | | | | | 715/779 |
| 9,031,382 | B1 | * | 5/2015 | Kaiser | G11B 27/00 |
| | | | | | 386/248 |
| 9,936,184 | B2 | * | 4/2018 | Kaiser | H04N 13/0062 |
| 2001/0000265 | A1 | * | 4/2001 | Schreiber | G06F 17/211 |
| | | | | | 726/30 |
| 2001/0034771 | A1 | * | 10/2001 | Hutsch | G06F 9/541 |
| | | | | | 709/217 |
| 2001/0047406 | A1 | * | 11/2001 | Araujo | H04L 29/06 |
| | | | | | 709/223 |
| 2002/0152234 | A1 | * | 10/2002 | Estrada | G06F 17/243 |
| | | | | | 715/201 |

(Continued)

FOREIGN PATENT DOCUMENTS

| | | |
|---|---|---|
| JP | H06-332853 A | 12/1994 |
| JP | 2005-004481 A | 1/2005 |

*Primary Examiner* — Scott T Baderman
*Assistant Examiner* — Hassan Mrabi
(74) *Attorney, Agent, or Firm* — Oliff PLC

(57) ABSTRACT

A client apparatus includes a memory that stores first data acquired from a predetermined external storage location, a generating unit that generates a screen including a first operation image for use in performing an operation related to the first data, an acquisition unit that acquires second data from the predetermined external storage location, and an updating unit that updates the screen by generating on the screen a second operation image for use in performing an operation related to the second data if the first data is different from the second data.

11 Claims, 7 Drawing Sheets

| | DATA | STORAGE LOCATION | 351 |
|---|---|---|---|
| 1 | manual.html | http://example.jp/manual.html | |
| 2 | operation_procedure_1.pdf | http://example.jp/pdf/operation_procedure_1.pdf | |
| 3 | operation_procedure_2.pdf | http://example.jp/pdf/operation_procedure_2.pdf | |
| 4 | power_of_attorney_template.pdf | http://example.jp/pdf/_power_of_attorney_template.pdf. | |

(56) References Cited

U.S. PATENT DOCUMENTS

| | | | | |
|---|---|---|---|---|
| 2002/0156808 | A1* | 10/2002 | Duffy | G06F 17/243 715/234 |
| 2003/0028562 | A1* | 2/2003 | Shaughnessy | G06F 17/243 715/234 |
| 2003/0191799 | A1* | 10/2003 | Araujo | H04L 63/0272 709/203 |
| 2004/0039848 | A1* | 2/2004 | Estrada | G06F 8/71 719/315 |
| 2004/0205644 | A1* | 10/2004 | Shaughnessy | G06F 17/24 715/255 |
| 2004/0226037 | A1* | 11/2004 | Myoki | G06Q 10/087 725/32 |
| 2004/0268224 | A1* | 12/2004 | Balkus | G06F 17/30056 715/203 |
| 2006/0136914 | A1* | 6/2006 | Marascio | G06F 11/3664 718/100 |
| 2006/0262915 | A1* | 11/2006 | Marascio | H04L 65/1053 379/201.01 |
| 2006/0288269 | A1* | 12/2006 | Oppenlander | G06F 17/243 715/207 |
| 2008/0109327 | A1* | 5/2008 | Mayle | G06Q 30/0603 705/27.1 |
| 2009/0164887 | A1* | 6/2009 | Ikegami | G06F 17/30 715/247 |
| 2011/0289448 | A1* | 11/2011 | Tanaka | G06F 17/30126 715/781 |
| 2013/0032634 | A1* | 2/2013 | McKirdy | A61B 5/0205 235/375 |
| 2013/0104032 | A1* | 4/2013 | Lee | G06F 17/30268 715/234 |
| 2014/0101562 | A1* | 4/2014 | Yao | H04L 67/06 715/738 |
| 2015/0095804 | A1* | 4/2015 | Grossman | G06F 3/0482 715/753 |
| 2015/0178029 | A1* | 6/2015 | Miyazawa | G06F 3/1253 358/1.15 |
| 2015/0271457 | A1* | 9/2015 | Kokojima | G06F 3/041 348/744 |
| 2016/0212208 | A1* | 7/2016 | Kulkarni | G06F 9/5072 |
| 2016/0267553 | A1* | 9/2016 | Slagel | G06Q 30/0276 |

* cited by examiner

FIG. 5
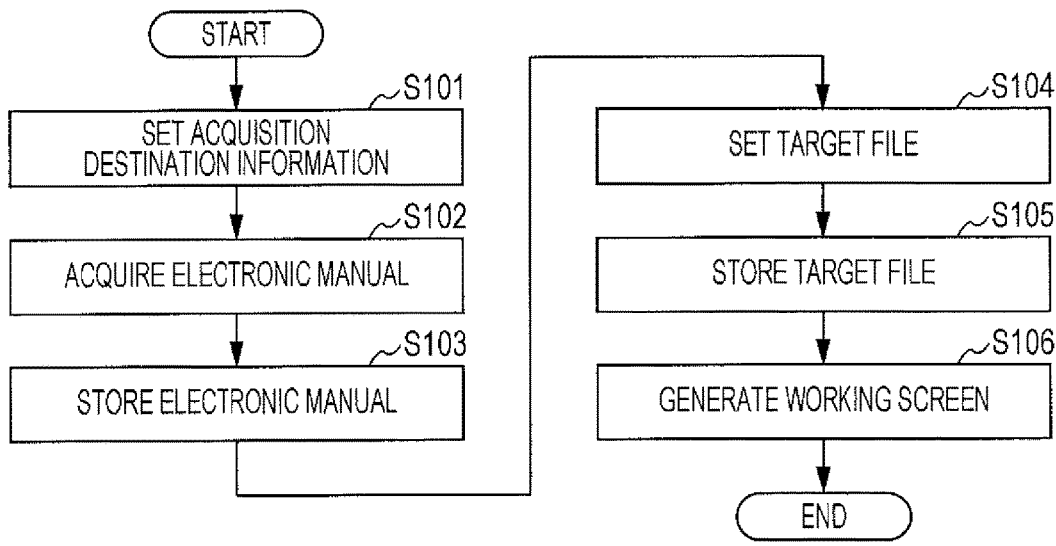
FIG. 6
| | DATA | STORAGE LOCATION | 351 |
|---|---|---|---|
| 1 | manual.html | http://example.jp/manual.html | |
| 2 | operation_procedure_1.pdf | http://example.jp/pdf/operation_procedure_1.pdf | |
| 3 | operation_procedure_2.pdf | http://example.jp/pdf/operation_procedure_2.pdf | |
| 4 | power_of_attorney_template.pdf | http://example.jp/pdf/_power_of_attorney_template.pdf. | |
FIG. 7
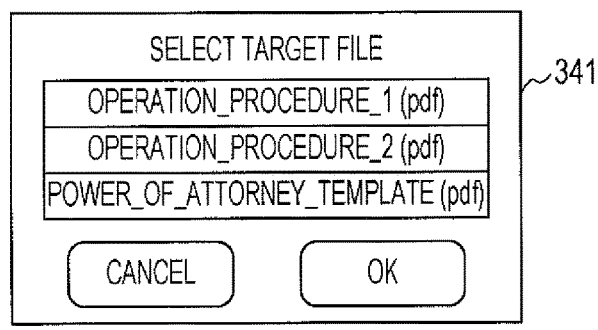

| | TARGET FILE | DESCRIPTION IN DATA ~352 | DATA FORMAT |
|---|---|---|---|
| 1 | power_of_attorney_template.pdf | <A href="../pdf/power_of_attorney_template.pdf" target="_blank">power_of_attorney_template</A> | HTML LINK ELEMENT |

| | TARGET FILE | FILE NAME ~353 |
|---|---|---|
| 1 | power_of_attorney.pdf | power of attorney |

| | TARGET FILE | FILE NAME |  ~353
|---|---|---|
| 1 | power_of_attorney_(old).pdf | power of attorney (old) |
| 2 | power_of_attorney.pdf | power of attorney |

| | TOOL | TOOL NAME |  ~354
|---|---|---|
| 1 | DOWNLOAD HTML FILE "manual.html" FROM URL "http://example.jp/manual.html" | DOWNLOAD OF ELECTRONIC MANUAL |
| 2 | EXTRACT FIRST PAGE | EXTRACTION OPERATION |

| | TOOL | TOOL NAME |
|---|---|---|
| 1 | DOWNLOAD HTML FILE "manual.html" FROM URL "http://example.jp/manual.html" | DOWNLOAD OF ELECTRONIC MANUAL |
| 2 | EXTRACT FIRST PAGE AND PERFORM OCR OPERATION ON FIRST PAGE | EXTRACTION AND OCR OPERATION |

354

CLIENT APPARATUS, INFORMATION
PROCESSING SYSTEM, INFORMATION
PROCESSING METHOD, AND
NON-TRANSITORY COMPUTER READABLE
MEDIUM

CROSS-REFERENCE TO RELATED APPLICATIONS

This application is based on and claims priority under 35 USC 119 from Japanese Patent Application No. 2016-115423 filed Jun. 9, 2016.

BACKGROUND (i) Technical Field

The present invention relates to a client apparatus, an information processing system, an information processing method, and a non-transitory computer readable medium.

(ii) Related Art

Some systems are available to assist users to perform a job by collectively managing data, programs, and Web sites used in the job.

SUMMARY

According to an aspect of the invention, there is provided a client apparatus. The client apparatus includes a memory that stores first data acquired from a predetermined external storage location, a generating unit that generates a screen including a first operation image for use in performing an operation related to the first data, an acquisition unit that acquires second data from the predetermined external storage location, and an updating unit that updates the screen by generating on the screen a second operation image for use in performing an operation related to the second data if the first data is different from the second data.

BRIEF DESCRIPTION OF THE DRAWINGS

Exemplary embodiments of the present invention will be described in detail based on the following figures, wherein:

FIG. 5 is a flowchart illustrating a generation process of a work environment;

FIG. 6 illustrates an example of a first management table;

FIG. 7 illustrates an example of a selection screen;

DETAILED DESCRIPTION

Figure 1:
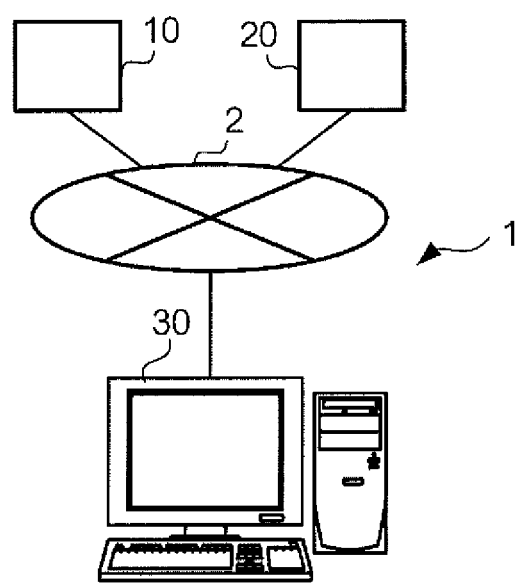
FIG. 1 illustrates an example of an information processing system.

FIG. 1 illustrates an example of an information processing system 1. The information processing system 1 includes a first server apparatus 10, a second server apparatus 20, and a client apparatus 30. The first server apparatus 10, the second server apparatus 20, and the client apparatus 30 are interconnected to each other via a communication network 2. The communication network 2 is the Internet, for example.

The first server apparatus 10 provides a predetermined service. The second server apparatus 20 provides data related to the service provided by the first server apparatus 10. The first server apparatus 10 and the second server apparatus 20 cooperate with each other, thereby forming a system that provides a predetermined service. Such a system may be an electronic bidding system, an application system, an attendance management system, or a corporate approval system. The client apparatus 30 receives a service from the first server apparatus 10 and the second server apparatus 20. The client apparatus 30 is used by a user.

Figure 2:
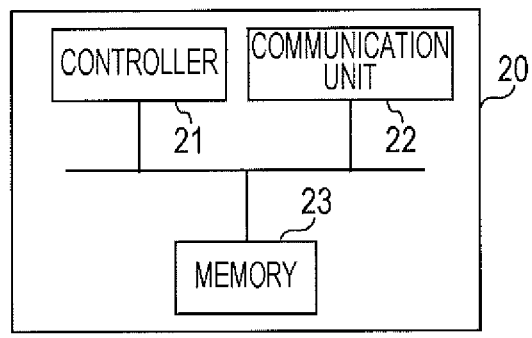
FIG. 2 illustrates a hardware configuration of a second server apparatus.

FIG. 2 illustrates a hardware configuration of the second server apparatus 20. The second server apparatus 20 includes a controller 21, a communication unit 22, and a memory 23. The controller 21 includes a central processing unit (CPU) and a memory. The controller 21 controls units of the second server apparatus 20. The communication unit 22 is connected to the communication network 2. The communication unit 22 communicates with the client apparatus 30 via the communication network 2. The memory 23 may be a hard disk, for example. The memory 23 stores a variety of data and programs. The memory 23 stores data related to a service provided by the first server apparatus 10. This data may be a service manual, for example. The memory 23 is an example of a "first memory" according to an exemplary embodiment of the present invention, for example. The first server apparatus 10 has a hardware configuration similar to that of the second server apparatus 20.

Figure 3:
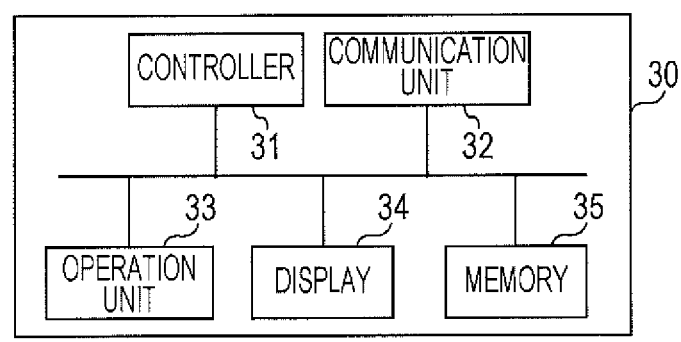
FIG. 3 illustrates a hardware configuration of a client apparatus.

FIG. 3 illustrates a hardware configuration of the client apparatus 30. The client apparatus 30 includes a controller 31, a communication unit 32, an operation unit 33, a display 34, and a memory 35. The controller 31 includes a CPU and a memory. The controller 31 controls units of the client apparatus 30. The communication unit 32 is connected to the communication network 2. The communication unit 32 communicates with the first server apparatus 10 and the second server apparatus 20 via the communication network 2. The operation unit 33 includes a mouse and a keyboard, for example. The operation unit 33 is used by the user. The display 34 includes a liquid-crystal display, for example. The display 34 displays a variety of information. The memory 35 includes a hard disk, for example. The memory 35 stores a variety of data and programs.

Figure 4:
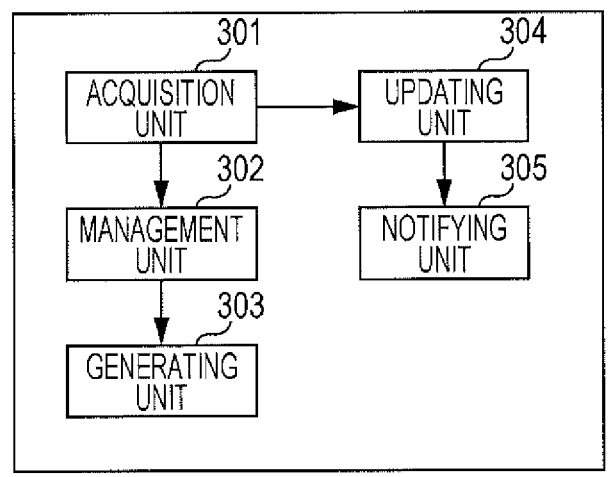
FIG. 4 illustrates a functional configuration of the client apparatus.

FIG. 4 illustrates a functional configuration of the client apparatus 30. The client apparatus 30 includes an acquisition unit 301, a management unit 302, a generating unit 303, an updating unit 304, and a notifying unit 305. These functions are implemented by the CPU that executes a program. The acquisition unit 301 acquires data from a predetermined storage location. The data may be an electronic manual, for example. In accordance with the exemplary embodiment, the storage location may be set up in the second server apparatus 20. The second server apparatus 20 is an example of a "server apparatus" in the exemplary embodiment of the present invention. The management unit 302 stores data acquired by the acquisition unit 301 on the memory 35 and then manages the stored data. The memory 35 is an example of a "memory" or a "second memory" in the exemplary embodiment of the present invention.

The generating unit 303 generates a screen including a first operation image for use in performing an operation related to data acquired by the acquisition unit 301. The operation related to the data includes an operation to output the data or an operation described in the data. The operation to output the data is to display the data, for example. The operation image may include an icon associated with the operation related to the data, or a thumbnail image. The operation image may be any object as long as the operation image is used to perform an operation related to the data.

If first data stored on the memory 35 is different from second data newly acquired by the acquisition unit 301, the updating unit 304 updates the screen by generating on the screen a second operation image for use in performing an operation related to the second data. When the updating unit 304 has updated the screen, the notifying unit 305 gives a notice of the updating of the first data. The notice of the updating of the first data is performed by displaying a message indicating the updating of the first data.

The first server apparatus 10 and the second server apparatus 20 may now cooperate to form an electronic bidding system. In this case, the first server apparatus 10 provides an electronic bidding service. The second server apparatus 20 provides an electronic manual for the electronic bidding system. The user performs a job for electronic bidding using the client apparatus 30. The job includes generating a document in accordance with a power of attorney template for electronic bidding, and uploading the generated document to the first server apparatus 10.

FIG. 5 is a flowchart illustrating the generation process of a work environment. In the generation process, data used in the job related to the electronic bidding is generated, and a work screen configured to collectively manage operations performed in the job is generated. The generation process may start in response to an operation by the user.

In step S101, the acquisition unit 301 sets acquisition destination information of an electronic manual for the electronic bidding service. In this example, the electronic manual is stored at a storage location in the second server apparatus 20 indicated by the uniform resource locator (URL) "http://example.jp/manual.html". The user may specify the URL using the operation unit 33. The acquisition unit 301 sets the URL specified in response to the operation by the user to be the acquisition destination information.

In step S102, the acquisition unit 301 acquires the electronic manual in response to the acquisition destination information set in step S101. The electronic manual is an example of "first data" in the exemplary embodiment of the present invention. The electronic manual is described in hypertext markup language (HTML). In this case, only HTML file "manual.html" forming the top page of the electronic manual is acquired. More specifically, the acquisition unit 301 transmits via the communication unit 32 to the second server apparatus 20 an acquisition request of the HTML file "manual.html" stored at a storage location indicated by the URL "http://example.jp/manual.html". In response to the acquisition request, the controller 21 in the second server apparatus 20 transmits the HTML file to the client apparatus 30 via the communication unit 32. The acquisition unit 301 in the client apparatus 30 receives the HTML file via the communication unit 32.

The HTML file "manual.html" includes three related files "operation_procedure_1.pdf", "operation_procedure_2.pdf", and "power_of_attorney.pdf" as link elements. The link element includes a URL indicating a storage location of the related files in the second server apparatus 20. For example, the link element of the related file "operation_procedure_1.pdf" includes URL "http://example.jp/pdf/operation_procedure_1.pdf". The link element of the related file "operation_procedure_2.pdf" includes URL "http://example.jp/pdf/operation_procedure_2.pdf". The link element of the related file "power_of_attorney_template.pdf" includes URL "http://example.jp/pdf/power_of_attorney_template.pdf".

The acquisition unit 301 acquires these related files in accordance with these URLs. More specifically, the acquisition unit 301 transmits via the communication unit 32 to the second server apparatus 20 an acquisition request of the related file "operation_procedure_1.pdf" stored at the storage location indicated by URL "http://example.jp/pdf/operation_procedure_1.pdf". The controller 21 in the second server apparatus 20 transmits this related file to the client apparatus 30 via the communication unit 22 in response to the acquisition request. The controller 31 receives the related file via the communication unit 32. The acquisition unit 301 acquires the other related files in a similar manner.

In step S103, the management unit 302 stores the electronic manual acquired in step S102 on the memory 35. More specifically, the management unit 302 generates a first management table 351 in accordance with the electronic manual acquired in step S102. The management unit 302 causes the memory 35 to store the generated first management table 351. The first management table 351 is used to manage the electronic manual acquired from the second server apparatus 20 and master copies of the related files.

FIG. 6 illustrates an example of the first management table 351. The first management table 351 includes two fields, namely, a "data" field and a "storage location" field. The "data" field stores data acquired from the second server apparatus 20. The "storage location" field stores information indicating the storage location of the data. In this example, the "data" field at the first row record stores an HTML file "manual.html". The "storage location" field at the first row record stores URL "http://example.jp/manual.html". The "data" field at a second row record stores a related file "operation_procedure_1.pdf". The "storage location" field at the second row record stores URL "http://example.jp/pdf/operation_procedure_1.pdf". Similarly, the third and fourth row records store the other related files acquired in step S102 described above and information indicating the storage locations of the related files.

Referring again to step S104 of FIG. 5, the management unit 302 sets a related file for use in the job related to the electronic bidding (hereinafter referred to as a "target file"). More specifically, the management unit 302 displays a selection screen 341 of the target file on the display 34. The management unit 302 sets the target file in response to an operation of the user.

FIG. 7 illustrates an example of the selection screen 341. The selection screen 341 includes a list of three related files "operation_procedure_1.pdf", "operation_procedure_2.pdf", and "power_of_attorney_template.pdf" acquired in step S102. The target files are valuable files used in the job related to the electronic bidding. If a target file is an old version, the job related to the electronic bidding may be difficult to continue. The target file may be desirably an updated version. The related file "power_of_attorney_template.pdf" is a power of attorney template to be used in the job related to the electronic bidding. It is assumed herein that the related file "power_of_attorney_template.pdf" from among the three related files is a valuable file to be used in the job related to the electronic bidding. In such a case, the user selects the related file "power_of attorney_template.pdf" using the operation unit 33. In this way, the related file "power_of attorney_template.pdf" is set to be the target file.

Referring again to FIG. 5, in step S105, the management unit 302 stores the target file set in step S104 on the memory 35. The target file is an example of a "first file" in the exemplary embodiment of the present invention. More specifically, the management unit 302 generates a second management table 352 in accordance with the target file set in step S104. The management unit 302 causes the memory 35 to store the generated second management table 352. The second management table 352 is used to manage information related to the target file.

Figures 8, 9, 10:
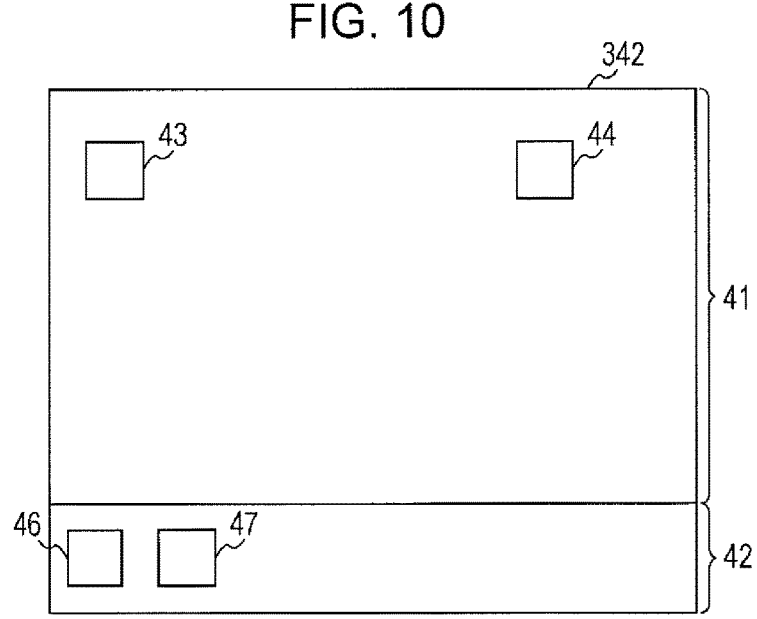
FIG. 8 illustrates an example of a second management table.
FIG. 9 illustrates an example of a third management table.
FIG. 10 illustrates an example of a work screen.

FIG. 8 illustrates an example of the second management table 352. The second management table 352 includes three fields, namely, a "target file" field, a "description in data" field, and a "data format" field. The "target file" field stores a target file. The "description in data" field stores a description portion of the electronic manual acquired in step S102 including information related to the target file. The "data format" field stores a format of the information related to the target file.

The "target file" field at the first row record stores the target file "power_of_attorney_template.pdf". The HTML file "manual.html" acquired in step S102 describes as a link element of the target file "power_of_attorney_template.pdf". The HTML file "manual.html" acquired in step S102 describes "<A_href=". ./pdf/power_of_ attorney_template.pdf"target="_blank">power_of_attorney_template</A>" as a link element of the target file "power_of_attorney_template.pdf". In this case, the description portion of the link element is an example of "first information" in the exemplary embodiment of the present invention. The "data format" field at the first row record stores a format "HTML link element".

The management unit 302 generates a third management table 353 in accordance with the target file set in step S104. The management unit 302 causes the memory 35 to store the third management table 353 thus generated. The third management table 353 is used to manage the target file used on a work screen 342.

FIG. 9 illustrates an example of the third management table 353. The third management table 353 includes two fields, namely, a "target file" field and a "file name" field. The "target file" field stores a target file. The "file name" field stores the file name of the target file. In this example, a copy of a target file "power_of_attorney_template.pdf" is produced. In succession, the file name of the copy of the target file is changed. This is intended to differentiate the copy from the target file "power_of_attorney_template.pdf" stored on the second management table 352. In this example, the file name "power_of_attorney_template.pdf" is changed to the file name "power_of_attorney.pdf". The "target file" field at the first row record stores the target file "power_of_attorney.pdf". The "file name" field at the first row record stores "power of attorney" that is a portion of the file name of the target file with the extension thereof removed.

Referring again to FIG. 5, in step S106, the generating unit 303 generates a work screen 342 for use in performing a job related the electronic bidding. The work screen 342 is an example of the "screen" in the exemplary embodiment of the present invention. More specifically, the generating unit 303 generates the work screen 342 including an icon associated with the target file, in accordance with the third management table 353.

FIG. 10 illustrates an example of the work screen 342. The work screen 342 includes a file region 41 and a tool region 42. The file region 41 displays an icon associated with a target file. This icon may be used to select or open the target file. If the target file is a document file or an image file, the operation to open the target file is to display a document or an image which indicates contents of the target file. The tool region 42 displays an icon associated with an operation performed in a job related to the electronic bidding (hereinafter referred to as a "tool icon"). The tool icon is used to perform an operation. The operation may indicate a single operation or a series of multiple operations.

In this example, the "target file" field of the third management table 353 stores the target file "power_of_attorney.pdf" as illustrated in FIG. 9. As illustrated in FIG. 10, an icon 43 associated with the target file is generated in the file region 41. The icon 43 is used to open the target file "power_of_attorney.pdf". The icon 43 is an example of a "first operation image" or a "third operation image" in the exemplary embodiment of the present invention.

The "data" field at the first row record of the first management table 351 stores the HTML file "manual.html" as illustrated in FIG. 6. In this case, an icon 44 associated with this HTML file may be generated in the file region 41 as illustrated in FIG. 10. The icon 44 is used to open the HTML file "manual.html". The icon 44 is an example of the "first operation image" in the exemplary embodiment of the present invention.

When the work screen 342 is generated in this way, the generated work screen 342 is displayed on the display 34. The user performs the job related to the electronic bidding using the work screen 342. To view the electronic manual of the electronic bidding, the user performs an operation to open the HTML file "manual.html" with the icon 44 of FIG. 10 using the operation unit 33. This operation is a double-click operation on the icon 44. In this way, the top page of the electronic manual as the contents of this HTML file is displayed on the display 34.

To use the power of attorney template, the user performs an operation to open the target file "power_of_attorney.pdf" with the icon 43 of FIG. 10, using the operation unit 33. This operation is a double-click operation on the icon 43. In this way, the power of attorney template is displayed as the contents of the target file on the display 34. With the power of attorney template displayed, the user produces a power of attorney in accordance with the power of attorney template using the operation unit 33. The user then uploads the power of attorney produced using the operation unit 33 to the first server apparatus 10. The job of submitting the power of attorney is thus complete.

The user may insert data in the target file "power_of_attorney.pdf" and then store the target file using the operation unit 33. In this way, the data is inserted into the target file "power_of_attorney.pdf" stored in the third management table 353 and is thus stored. Even if the contents of the target file "power_of_attorney.pdf" are modified on the work screen 342, the contents of the target file "power_of_attorney_template.pdf" stored in the first management table 351 and the contents of the target file "power_of_attorney_template.pdf" stored in the second management table 352 are not modified.

Figure 11:
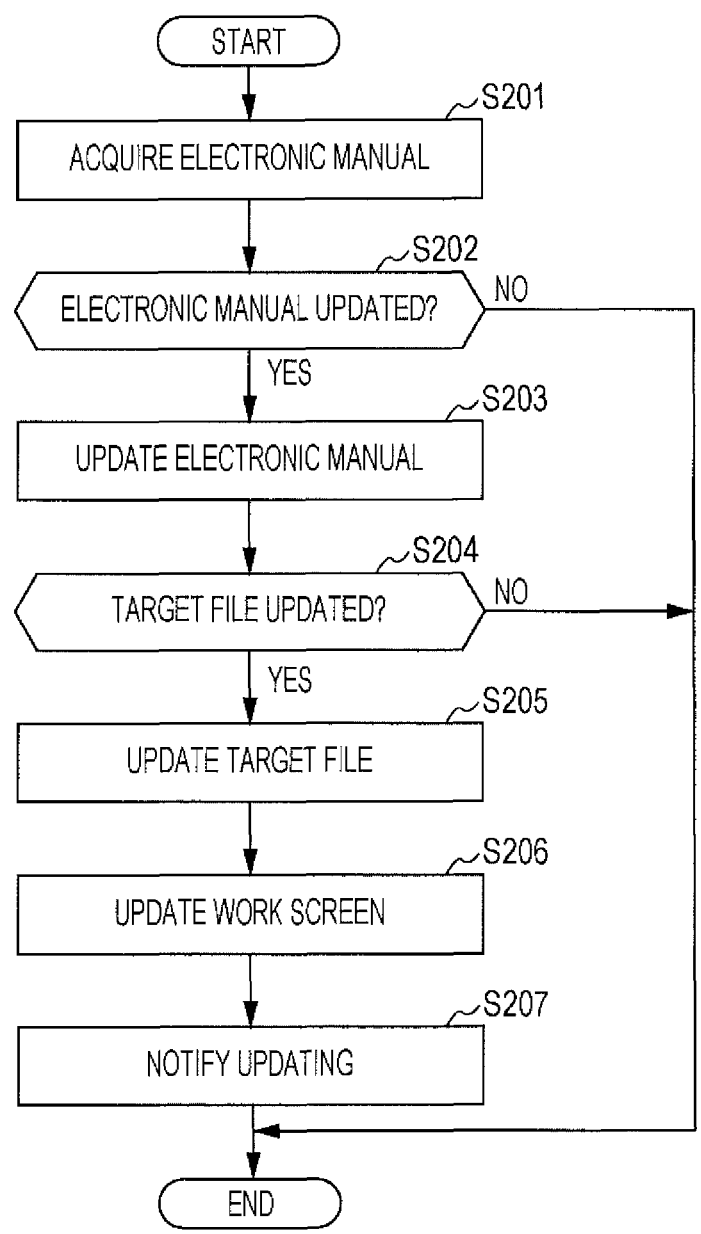
FIG. 11 is a flowchart illustrating an update verification process.

FIG. 11 is a flowchart illustrating an update verification process. The electronic manual stored on the second server apparatus 20 may be updated in response to a modification of a service provided by the first server apparatus 10. This operation is performed to verify whether the electronic manual has been updated. This operation is performed at a predetermined timing. For example, this operation may be performed each time the work screen 342 is opened.

In step S201, the acquisition unit 301 acquires the electronic manual in accordance with the acquisition destination information set in step S101 described above. The electronic manual is an example of "second data" in the exemplary embodiment of the present invention. More specifically, the electronic manual is acquired in the procedure described below. As illustrated in FIG. 6, the "storage location" field at the first row field of the first management table 351 stores URL "http://example.jp/manual.html". This URL is the acquisition destination information set in S101 described above. The acquisition unit 301 reads this URL from the first management table 351. The acquisition unit 301 transmits via the communication unit 32 to the second server apparatus 20 an acquisition request of the HTML file "manual.html" stored on the storage location indicated by the read URL. In response to the acquisition request, the controller 21 in the second server apparatus 20 transmits the HTML file to the client apparatus 30 via the communication unit 22. The acquisition unit 301 in the client apparatus 30 receives the HTML file via the communication unit 32.

In the following discussion, the HTML file "manual.html" stored in the first management table 351 is referred to as an "existing HTML file", and an HTML file "manual.html" newly acquired in step S201 is referred to as a "new HTML file".

Based on the link elements included in existing files, the acquisition unit 301 acquires three related files "operation_procedure_1.pdf", "operation_procedure_2.pdf", and "power_of_attorney_template.pdf". More specifically, the related files are acquired in the following procedure. In this example as illustrated in FIG. 6, second through fourth row records of the first management table 351 store URL "http://example.jp/pdf/operation_procedure_1.pdf", URL "http://example.jp/pdf/operation_procedure_2.pdf", and URL "http://example.jp/pdf/power_of_attorney_template.pdf" included in the link elements of these related files. The acquisition unit 301 reads these files from the first management table 351. The acquisition unit 301 then transmits via the communication unit 32 to the second server apparatus 20 an acquisition request of the related file "operation_procedure_1.pdf" stored at the storage location indicated by the read URL "http://example.jp/pdf/operation_procedure_1.pdf". In response to the acquisition request, the controller 21 in the second server apparatus 20 transmits this HTML file to the client apparatus 30 via the communication unit 22. The controller 31 receives the HTML file via the communication unit 32. The acquisition unit 301 acquires the other related files in a similar manner.

In the following discussion, the related file stored in the first management table 351 is referred to as an "existing related file" while a related file newly acquired in step S201 is referred to as a "new related file". Also, a target file "power_of_attorney_template.pdf" stored in the second management table 352 is referred to as an "existing target file" while a related file "power_of_attorney_template.pdf" set to be a target file from among related files newly acquired in step S201 is referred to as a "new target file". The new target file is an example of a "second file" in the exemplary embodiment of the present invention.

Referring again to FIG. 11, the updating unit 304 determines in S202 that the electronic manual has been updated. More specifically, the updating unit 304 compares an existing HTML file with a new HTML file. The updating unit 304 also compares an existing related file with a new related file. These comparison operations are performed by comparing binary files, for example. If the comparison results indicate that there is no difference between the existing HTML file and the new HTML file and that there is no difference between the existing related file and the new related file, the updating unit 304 determines that the electronic manual has not been updated (no branch from step S202). The process thus ends. In this case, the new HTML file and related file acquired in step S201 may be deleted.

On the other hand, if the existing HTML file is different from the new HTML file or at least one of the existing related files is different from at least one of the new related files, the updating unit 304 determines that the electronic manual has been updated (yes branch from step S202). If the related file is not acquired because of a disconnected link in step S201 described above, the updating unit 304 determines that the electronic manual has been updated. In such a case, processing proceeds to step S203.

In step S203, the management unit 302 updates the electronic manual. More specifically, the management unit 302 updates the first management table 351 in accordance with the new HTML file or the new related file. In this example as illustrated in FIG. 6, the "data" field at the first row record of the first management table 351 stores the existing HTML file "manual.html". If the existing HTML file is different from the new HTML file, the management unit 302 stores the new HTML file "manual.html" in place of the existing HTML file "manual.html". In this case, the existing HTML file "manual.html" is deleted.

If the related file is not acquired because of a disconnected link in step S201 described above, the management unit 302 updates the first management table 351 as described below. It is assumed herein that the related file "operation_procedure_1.pdf" is not acquired because of the disconnected link. In this example as illustrated in FIG. 6, the "data" field at the second row record of the first management table 351 stores the existing related file "operation_procedure_1.pdf". The management unit 302 stores information indicating the disconnected link at the second row record of the first management table 351. In this case, the existing related file "operation_procedure_1.pdf" and URL "http://example.jp/pdf/operation_procedure_1.pdf" stored at the second row remain without being deleted.

Referring again to FIG. 11, in step S204, the updating unit 304 determines whether the target file has been updated. More specifically, the updating unit 304 compares an existing HTML file with a new HTML file. The comparison is performed using a diff command, for example. If the existing HTML file is different from the new HTML command, the updating unit 304 further determines whether a different portion is a description portion of information related to the target file. In this case, as illustrated in FIG. 8, the "description in data" field at the first row field of the second management table 352 stores a description portion of a link element "A_href=". ./pdf/power_of_attorney_template/pdf" target="_blank">power_of_attorney_template</A>. This description portion of the link element serves a description portion of the information related to the target file. The description portion of the link element included in the new HTML file is an example of "second information" in the exemplary embodiment of the present invention.

If a different portion between the existing HTML file and the new HTML file is not the description portion of the link element of the target file, the updating unit 304 further compares an existing target file with a new target file. These comparison operations are performed by comparing binary files. If the different portion between the existing HTML file and the new HTML file is not the description portion of the link element of the target file and there is no difference between the existing target file and the new target file, the updating unit 304 determines that the target file has not been updated (no branch from step S204). The process thus ends.

On the other hand, if the different portion between the existing target file and the new target file is the description portion of the link element of the target file, or the existing target file is different from the new target file, the updating unit 304 determines that the target file has been updated (yes branch from step S204). It is noted that if the target file "power_of_attorney_template.pdf" is not acquired because of a disconnected link in step S201 described above, the updating unit 304 determines that the target file has been updated. Processing proceeds to step S205.

In step S205, the management unit 302 updates the target file. More specifically, the management unit 302 updates the second management table 352 in accordance with the new target file. If the existing target file is different from the new target file, the second management table 352 is updated as described below. In this example as illustrated in FIG. 8, the "target file" field of the second management table 352 stores the existing target file "power_of_attorney_template.pdf". The management unit 302 stores the new target file "power_of_attorney_template.pdf" in place of the existing target file "power_of_attorney_template.pdf". In this case, the existing target file "power_of_attorney_template.pdf" is deleted.

If the existing HTML file is different from the new HTML file, and the difference therebetween is a description portion of the link element of the target file, the second management table 352 is updated as described below. In this case, as illustrated in FIG. 8, the "description in data" field of the second management table 352 stores a description portion of a link element "A_href=". ./pdf/power_of_attorney_template/pdf"target="_blank"_power_of_attorney_template</A>". The management unit 302 stores a description portion of the link element of the target file "power_of_attorney_template.pdf" included in the new HTML file in place of the description portion of this link element. In this case, the description portion of the link element of the target file "power_of_attorney_template.pdf" included in the existing HTML file, namely, "A_href=". ./pdf/power_of_attorney_template/pdf"target="_blank">power_of_attorney_ template</A>" is deleted.

If the existing target file is different from the new target file, the management unit 302 updates the third management table 353 in accordance with the new target file.

Figures 12, 13, 14:
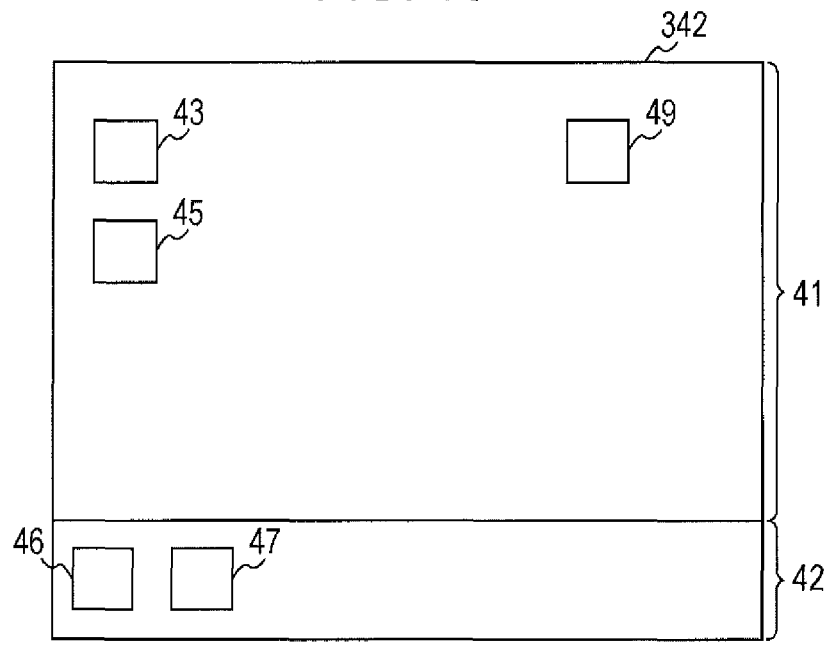
FIG. 12 illustrates an example of the third management table in an updated state thereof.
FIG. 13 illustrates an example of the work screen in an updated state thereof.
FIG. 14 illustrates an example of a fourth management table.

FIG. 12 illustrates an example of the third management table 353 in the updated state thereof. In this example, a copy of the new target file "power_of_attorney_template.pdf" is generated. In succession, the file name of the copied target file is changed. This is intended to differentiate the copy from the target file "power_of_attorney_template.pdf" newly stored on the second management table 352. In this example, the file name is changed from "power_of_attorney_template.pdf" to "power_of_attorney.pdf". As illustrated in FIG. 12, the third management table 353 includes a second row record that is added. The "target file" field at the second row field stores the copy of the target file "power_of_attorney.pdf". The "file name" field at the second row record stores the file name "power of attorney" with the extension thereof removed from the changed file name. In advance of this operation, the file name of the target file "power_of_attorney.pdf" stored at the first row record is changed. This is intended to differentiate the target file name from the target file "power_of_attorney.pdf" newly stored at the second row record. In this case, the file name is changed from "power_of_attorney.pdf" to "power_of_attorney_(old).pdf".

Before the target file "power_of_attorney_(old).pdf" is stored, the user may sometimes insert data into the target file "power_of_attorney_(old).pdf". The management unit 302 then moves the data from the target file "power_of_attorney_(old).pdf" to the newly stored target file "power_of_attorney.pdf". This data movement may be performed in the following procedure. Entry columns having the same item name are identified from among the target files. The data inserted in the identified entry column is extracted from the target file "power_of_attorney_(old).pdf" and then the extracted data is inserted into the target file "power_of_attorney.pdf".

If the target file is not acquired because of a disconnected link in step S201 described above, the following operation may be performed. The acquisition unit 301 extracts a URL indicating a new storage location from the link element of the target file "power_of_attorney_template.pdf" included in the new HTML file. The acquisition unit 301 extracts via the communication unit 32 a new target file "power_of_attorney_template.pdf" from the storage location indicated by that extracted URL. The management unit 302 updates the second management table 352 and the third management table 353 in accordance with the new target file "power_of_attorney_template.pdf" and a description portion of the link element of the target file included in the new HTML file. The updating is performed in a manner described above.

Referring again to FIG. 11, in step S206, the updating unit 304 updates the work screen 342. More specifically, the updating unit 304 generates on the work screen 342 an icon associated with the target file newly stored on the third management table 353.

FIG. 13 illustrates an example of the work screen 342 in an updated state thereof. In this example as illustrated in FIG. 12, the second row record of the third management table 353 newly stores the target file "power_of_attorney.pdf". In this case, an icon 45 associated with the target file "power_of_attorney.pdf" is generated in the file region 41 as illustrated in FIG. 13. The icon 45 is used to open the target file "power_of_attorney.pdf". The icon 45 is an example of the "second operation image" and a "fourth operation image" in the exemplary embodiment of the present invention. The icon 43 associated with the target file "power_of_attorney_(old).pdf" remains without being deleted in the file region 41. This is because the user may possibly view the template of the power of attorney in an unupdated state. It is noted that the file name of the target file "power_of_attorney_(old).pdf" has been changed. If the icon 45 is labeled a file name, the file name is changed from "power_of_attorney.pdf" to "power_of_attorney_(old).pdf"

As illustrated in FIG. 13, an icon 49 associated with the new HTML file may be generated in place of the icon 44 associated with the existing HTML file. The icon 49 is used to open the new HTML file. The icon 49 is an example of the "second operation image" in the exemplary embodiment of the present invention.

Referring again to FIG. 11, in step S207, the notifying unit 305 displays on the display 34 a message notifying the updating of the target file. For example, the message may be "the power of attorney template has been updated". The message may be displayed in a pop-up manner.

When the work screen 342 has been updated, the user performs a job related to the electronic bidding using the updated work screen 342. To view the electronic manual for the electronic bidding, the user may perform an operation to open the new HTML file "manual.html" with the icon 49 using the operation unit 33. This operation is a double-click operation on the icon 49, for example. In this way, the top page of the updated electronic manual is displayed as the contents of the new HTML file on the display 34.

To use the updated template of the power of attorney, the user performs an operation to open the new target file "power_of_attorney.pdf" with the icon 45 using the operation unit 33. This operation is a double-click operation on the icon 45. In this way, the updated template of power of attorney is displayed as the contents of the new target file on the display 34. When the updated template of power of attorney is displayed, the user generates a power of attorney in accordance with the updated template of power of attorney using the operation unit 33. The user uploads the generated power of attorney to the first server apparatus 10 by operating the operation unit 33. The job of submitting the power of attorney is thus complete.

In accordance with the exemplary embodiment, the work screen 342 is provided to assist the user to perform the job of using data, including the electronic manual and the related files acquired from the second server apparatus 20. When the data stored on the second server apparatus 20 is updated, the user is able to use the updated data from the work screen 342 in a manner free from any user intervention related to the data updating. Since the job is performed using the updated data in this case, the user is assured of continuing the job without inconvenience. If a power of attorney is generated using an old template of power of attorney, the electronic bidding system may not possibly accept that power of attorney. In such a case, the job of the electronic bidding is interrupted. In accordance with the exemplary embodiment, such inconvenience is controlled. The user free from any particular operation related to the data updating performs the job in a time saving manner.

Modifications

The exemplary embodiment described above is only one exemplary embodiment of the present invention. The exemplary embodiment may be modified as described below. Modifications described below may be combined in use.

Modification 1

In accordance with the exemplary embodiment, the icons generated on the work screen 342 are not limited to those associated with a target file. For example, a tool icon associated with an operation performed in the job related to the electronic bidding may be generated on the work screen 342. In such a case, the management unit 302 generates a fourth management table 354 in response to the operation performed in the job related to the electronic bidding. The management unit 302 then causes the memory 35 to store the generated fourth management table 354. The fourth management table 354 is used to manage the operation performed in the job related to the electronic bidding.

FIG. 14 illustrates an example of the fourth management table 354. The fourth management table 354 includes a "tool" field and a "tool name" field. The "tool" field stores information related to an operation performed in the job related to the electronic bidding. The "tool name" field stores a name of the operation. The generating unit 303 generates a tool icon on the work screen 342 in accordance with the fourth management table 354.

As illustrated in FIG. 14, the "tool" field at the first row record of the fourth management table 354 stores contents of an operation to "download HTML file "manual.html" from URL "http://example.jp/manual.html"". In this case, a tool icon 46 associated with this URL "http://example.jp/manual.html" is generated in the tool region 42 on the work screen 342 as illustrated in FIG. 13. The tool icon is used to perform an operation to download the HTML file "manual.html" from URL "http://example.jp/manual.html". The tool icon 46 is used to perform an operation to download the HTML file "manual.html" from URL "http://example.jp/manual.html". When the operation to download is performed using the tool icon 46, the HTML file "manual.html" is acquired from the storage location indicated by URL "http://example.jp/manual.html". This operation is a double-click operation on the tool icon 46, for example. The top page of the electronic manual may be displayed as the contents of the acquired HTML file on the display 34.

Also, as illustrated in FIG. 14, the "tool" field at the second row record of the fourth management table 354 stores an operation to "extract first page". The operation is described in the electronic manual, for example. The operation is an example of a "first operation" in the exemplary embodiment of the present invention. In this case, a tool icon 47 associated with the operation to extract the first page is generated in the tool region 42 on the work screen 342 as illustrated in FIG. 13. The tool icon 47 is used to perform an operation to extract the first page. The tool icon 47 is an example of a "fifth operation image" in the exemplary embodiment of the present invention. If an operation to perform an operation using the tool icon 47 is performed with a given file selected, the first page is extracted from the selected file. This operation is a double-click operation on the tool icon 47.

When the electronic manual is updated, the operation procedure described in the electronic manual may be updated. The verification of the updating of the operation procedure may be performed as described with reference to step S204 described above. For example, using the diff command, an existing HTML file is compared with a new HTML file to determine whether there is any difference in the description portions of the operation procedures included in the electronic manuals. If the description portion of the operation procedure included the electronic manual has been updated, the management unit 302 updates the fourth management table 354 in accordance with the updated operation procedure.

Figures 15, 16:
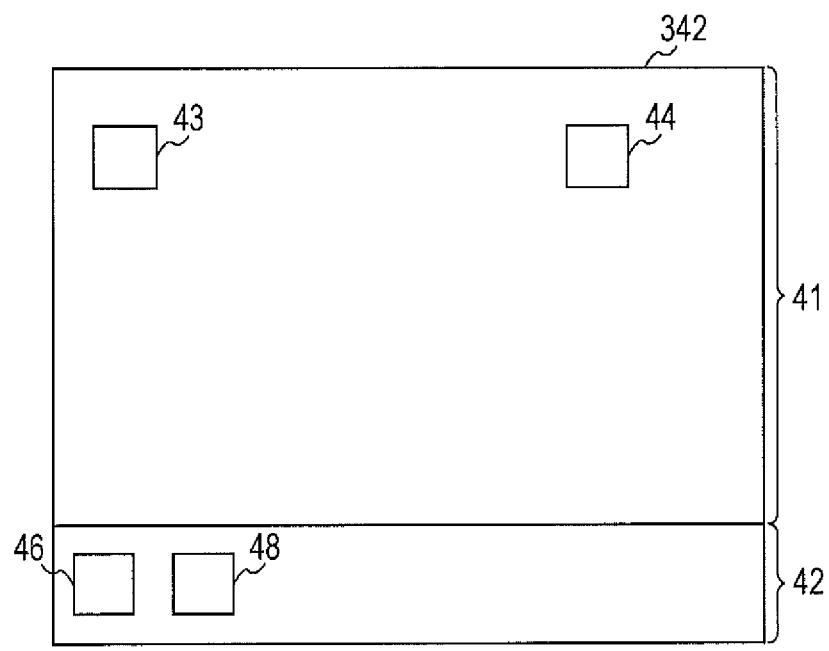
FIG. 15 illustrates an example of the fourth management table in an updated state thereof.
FIG. 16 illustrates an example of the work screen in an updated state thereof.

FIG. 15 illustrates an example of the fourth management table 354 in an updated state thereof. In this case, the operation is modified from "extract first page" to "extract first page and perform optical character recognition (OCR) operation on first page". The post-update operation is a "second operation" in the exemplary embodiment of the present invention. As illustrated in FIG. 14, the "tool" field at the second row record of the fourth management table 354 stores a pre-update operation to "extract first page". The management unit 302 stores the post-update operation to "extract first page and perform OCR on first page" in place of the pre-update operation. In such a case, the pre-update operation to "extract first page" is deleted.

If the fourth management table 354 is updated in this way, the work screen 342 is also updated in a similar manner as in step S206 described above.

FIG. 16 illustrates an example of the work screen 342 in an updated state thereof. A tool icon 48 associated with the post-update operation to "extract first page and perform OCR operation on first page" is generated on the tool region 42 in place of the tool icon 47 associated with the pre-update operation to "extract first page". In such a case, the tool icon 47 associated with the pre-update operation is deleted. The tool icon 48 is used to perform an operation to extract the first page and perform the OCR operation on the first page. The tool icon 48 is an example of a "sixth operation image" in the exemplary embodiment of the present invention. If the operation using the tool icon 47 is performed with a given file selected, the first page is extracted from the selected file, and the OCR operation is performed on the extracted first page.

Modification 2

In step S204 described above, the existing target file is compared with the new target file after the existing HTML file is compared with the new HTML file. Any of these comparison operations may be performed first.

Modification 3

In accordance with the exemplary embodiment, the new icon and the existing icon may be changed in display form to differentiate one from the other. For example, the color of the existing icon may be reduced in chroma. The color of the existing icon may be set to be translucent. A mark that indicates that an icon is newly generated, for example, a mark labeled "NEW" may be attached to the new icon. The color of the new icon may be changed to a conspicuous color. The existing icon or the new icon may be changed in size so that the new icon is larger than the existing icon.

Modification 4

In accordance with the exemplary embodiment, the first server apparatus 10 and the second server apparatus 20 may not necessarily be housed in separate casings. The first server apparatus 10 and the second server apparatus 20 may be integrated into a unitary apparatus. The first server apparatus 10 may not necessarily be used. The second server apparatus 20 may provide data that is used in the job performed by the client apparatus 30.

Modification 5

In accordance with the exemplary embodiment, the target file may be a document file, an image file, or a file in a different form. For example, the target file may be an audio file. In such a case, an icon associated with the audio file is generated on the work screen 342. If an operation to open the audio file is performed using that icon, the corresponding audio is reproduced. The target file may be a moving image file. In such a case, an icon associated with the moving image file is generated on the work screen 342. If an operation to open the moving image file is performed using that icon, the corresponding moving image is reproduced. The reproduction of the audio file or the moving image file is also included in the operation related to the target file.

Modification 6

In accordance with the exemplary embodiment, the electronic manual includes the description portion of the link element of the related file. Alternatively, the related file itself may be included in the electronic manual. The related file may be attached to the electronic manual.

Modification 7

In accordance with the exemplary embodiment, the program to be executed by the CPU of the controller 21 and the program to be executed by the CPU in the controller 31 may be downloaded via the communication network 2, such as the Internet. These programs may be provided in a recorded state on one of computer readable recording media, including a magnetic recording medium (such as a magnetic tape, or a magnetic disk), an optical recording medium (such as an optical disk), a magneto-optical recording medium, and a semiconductor memory.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A client apparatus comprising:
a processor programmed to act as:
a management unit that generates
a first management table storing i) an existing file of first data and a first address indicating a storage location of a new file of the first data in a predetermined external storage and ii) an existing file of second data and a second address indicating a storage location of a new file of the second data in the predetermined external storage, the second data being related to the first data;
a second management table storing i) the existing file of the second data and ii) a field indicating a description of the existing file of the second data; and
a third management table storing i) a copy of the new file of the second data and ii) a field indicating a name of the new file of the second data; and
a memory that stores the first management table, the second management table, and the third management table; wherein
the processor is further programmed to act as:
an acquisition unit that transmits the first address and the second address to the predetermined external storage and acquire the new file of the first data and the new file of the second data from the predetermined external storage;
an updating unit that:
determines that the first data is updated when the existing file of the first data is different from the new file of the first data, so that the management unit replaces the existing file of the first data stored in the first management table with the new file of the first data; and
further determines that the second data is updated when the existing file of the second data is different from the new file of the second data, so that the management unit replaces the existing file of the second data stored in the second management table with the new file of the second data; and
a generating unit that generates on a screen i) a first operating image associated with the new file of the first data stored in the first management table when the existing file of the first data is different from the new file of the first data and ii) a second operating image associated with the copy of the new file of the second data stored in the third management table.

2. The client apparatus according to claim 1, wherein the processor is further programmed to act as a notifying unit that gives a notice of the updating of the first data if the screen is updated by the updating unit.

3. The client apparatus according to claim 2, wherein the first data includes a first file or first information indicating a storage location of the first file,
- wherein the memory stores the first file that is included in the first data or acquired from the storage location indicated by the first information,
- wherein the screen includes a third operation image for performing an operation to open the first file,
- wherein the second data includes a second file or second information indicating a storage location of the second file, and
- wherein the updating unit generates on the screen a fourth operation image for performing an operation to open the second file if the first information is different from the second information or the first file is different from the second file.

4. The client apparatus according to claim 1, wherein a first operation is described in the first data,
- wherein the screen includes a fifth operation image for performing the first operation,
- wherein a second operation is described in the second data, and
- wherein the updating unit generates on the screen a sixth operation image, for performing the second operation, with the sixth operation image replacing the fifth operation image if the first operation is different from the second operation.

5. The client apparatus according to claim 2, wherein a first operation is described in the first data,
- wherein the screen includes a fifth operation image for performing the first operation,
- wherein a second operation is described in the second data, and
- wherein the updating unit generates on the screen a sixth operation image, for performing the second operation, with the sixth operation image replacing the fifth operation image if the first operation is different from the second operation.

6. The client apparatus according to claim 1, wherein the first data includes a first file or first information indicating a storage location of the first file,
- wherein the memory stores the first file that is included in the first data or acquired from the storage location indicated by the first information,
- wherein the screen includes a third operation image for performing an operation to open the first file,
- wherein the second data includes a second file or second information indicating a storage location of the second file, and
- wherein the updating unit generates on the screen a fourth operation image for performing an operation to open the second file if the first information is different from the second information or the first file is different from the second file.

7. The client apparatus according to claim 6, wherein a first operation is described in the first data,
- wherein the screen includes a fifth operation image for performing the first operation,
- wherein a second operation is described in the second data, and
- wherein the updating unit generates on the screen a sixth operation image, for performing the second operation, with the sixth operation image replacing the fifth operation image if the first operation is different from the second operation.

8. The client apparatus according to claim 3, wherein a first operation is described in the first data,
- wherein the screen includes a fifth operation image for performing the first operation,
- wherein a second operation is described in the second data, and
- wherein the updating unit generates on the screen a sixth operation image, for performing the second operation, with the sixth operation image replacing the fifth operation image if the first operation is different from the second operation.

9. An information processing system comprising:
- a server apparatus including a predetermined external storage that stores data; and
- a client apparatus including:
  - a processor programmed to act as:
    - a management unit that generates
      - a first management table storing i) an existing file of first data and a first address indicating a storage location of a new file of the first data in the predetermined external storage and ii) an existing file of second data and a second address indicating a storage location of a new file of the second data in the predetermined external storage, the second data being related to the first data;
      - a second management table storing i) the existing file of the second data and ii) a field indicating a description of the existing file of the second data; and
      - a third management table storing i) a copy of the new file of the second data and ii) a field indicating a name of the new file of the second data; and
    - a memory that stores the first management table, the second management table, and the third management table; wherein
  - the processor is further programmed to act as:
    - an acquisition unit that transmits the first address and the second address to the server and to acquire the new file of the first data and the new file of the second data from the server;
    - an updating unit that:
      - determines that the first data is updated when the existing file of the first data is different from the new file of the first data, so that the management unit replaces the existing file of the first data stored in the first management table with the new file of the first data; and
      - further determines that the second data is updated when the existing file of the second data is different from the new file of the second data, so that the management unit replaces the existing file of the second data stored in the second management table with the new file of the second data; and
    - a generating unit that generates on a screen i) a first operating image associated with the new file of the first data stored in the first management table when the existing file of the second data is different from the new file of the second data and ii) a second operating image associated with the copy of the new file of the second data stored in the third management table.

10. An information processing method comprising:
generating a first management table storing i) an existing file of first data and a first address indicating a storage location of a new file of the first data in a predetermined external storage and ii) an existing file of second data and a second address indicating a storage location of a new file of the second data in the predetermined external storage, the second data being related to the first data,
- a second management table storing i) the existing file of the second data and ii) a field indicating a description of the existing file of the second data, and
- a third management table storing i) a copy of the new file of the second data and ii) a field indicating a name of the new file of the second data;

storing the first management table, the second management table, and the third management table;

transmitting the first address and the second address to the predetermined external storage, and acquiring the new file of the first data and the new file of the second data from the predetermined external storage;

determining that the first data is updated when the existing file of the first data is different from the new file of the first data and replacing the existing file of the first data stored in the first management table with the new file of the first data;

determining that the second data is updated when the existing file of the second data is different from the new file of the second data, and replacing the existing file of the second data stored in the second management table with the new file of the second data; and generating on a screen i) a first operating image associated with the new file of the first data stored in the first management table when the existing file of the first data is different from the new file of the first data and ii) a second operating image associated with the copy of the new file of the second data stored in the third management table.

11. A non-transitory computer readable medium storing a program causing a computer to execute a process for processing information, the process comprising:

generating a first management table storing i) an existing file of first data and a first address indicating a storage location of a new file of the first data in a predetermined external storage and ii) an existing file of second data and a second address indicating a storage location of a new file of the second data in the predetermined external storage, the second data being related to the first data,
- a second management table storing i) the existing file of the second data and ii) a field indicating a description of the existing file of the second data, and
- a third management table storing i) a copy of the new file of the second data and ii) a field indicating a name of the new file of the second data;

storing the first management table, the second management table, and the third management table;

transmitting the first address and the second address to the predetermined external storage, and acquiring the new file of the first data and the new file of the second data from the predetermined external storage;

determining that the first data is updated when the existing file of the first data is different from the new file of the first data and replacing the existing file of the first data stored in the first management table with the new file of the first data;

determining that the second data is updated when the existing file of the second data is different from the new file of the second data, and replacing the existing file of the second data stored in the second management table with the new file of the second data; and generating on a screen i) a first operating image associated with the new file of the first data stored in the first management table when the existing file of the first data is different from the new file of the first data and ii) a second operating image associated with the copy of the new file of the second data stored in the third management table.

\* \* \* \* \*